May 6, 1952 H. HEIMANN 2,595,787
RETAINING RING ASSEMBLY
Filed March 12, 1947 2 SHEETS—SHEET 1
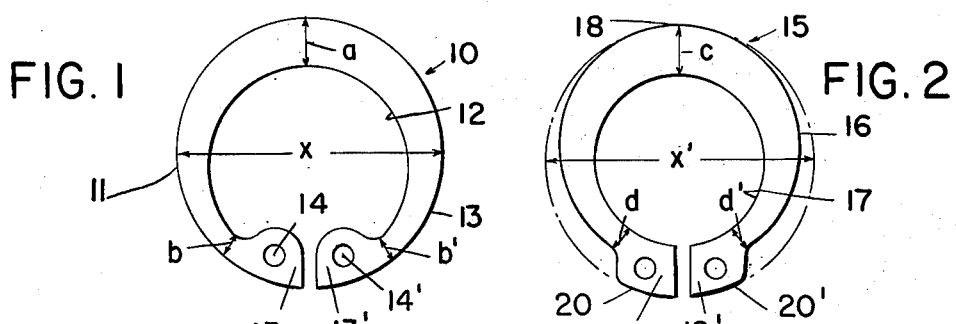
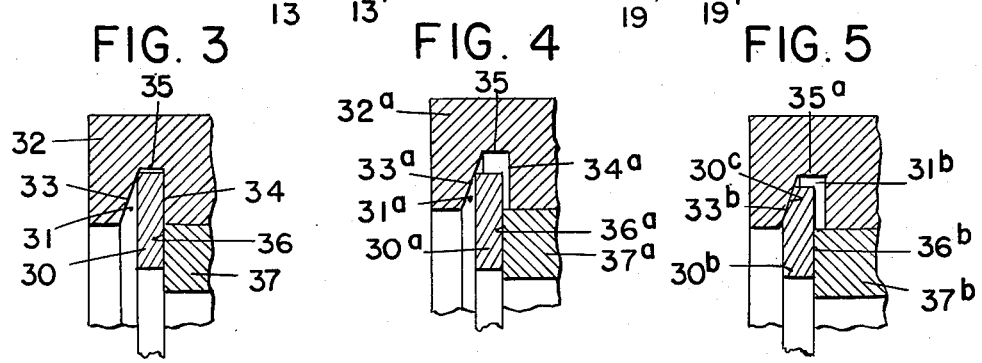
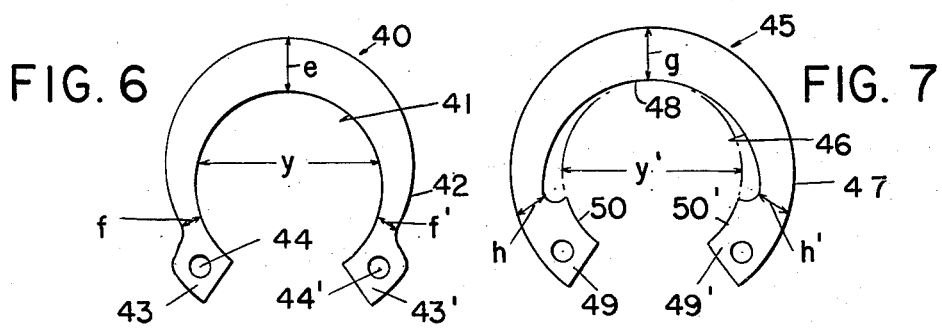
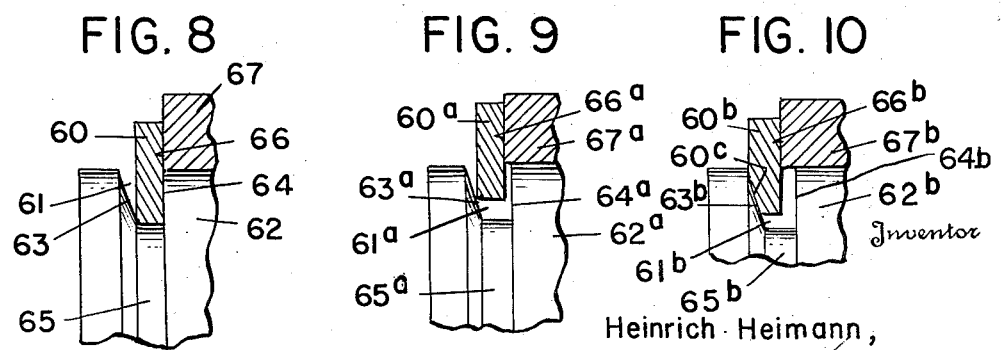
Inventor
Heinrich Heimann, May 6, 1952     H. HEIMANN     2,595,787

RETAINING RING ASSEMBLY

Filed March 12, 1947     2 SHEETS—SHEET 2

Inventor
Heinrich Heimann,
By
Attorney

Patented May 6, 1952

2,595,787

UNITED STATES PATENT OFFICE 2,595,787

RETAINING RING ASSEMBLY

Heinrich Heimann, New York, N. Y., assignor to Waldes Kohinoor, Inc., Long Island City, N. Y., a corporation of New York Application March 12, 1947, Serial No. 734,277

9 Claims. (Cl. 287—53)

This invention relates to improvements in retaining ring assemblies of the type wherein a retaining ring provides an artificial shoulder which functions to secure a machine part against axial displacement on a shaft, pin or the like, or in the bore of a housing, and to improved retaining rings for use in such assemblies.

The conventional retaining ring is usually shaped as a split ring of spring material capable of being spread over the end of a shaft or contracted in the bore of a housing and, upon release, of spring-seating itself into a groove provided for its reception in the shaft or housing. It is essential that in spreading or contracting such a ring, the working stresses do not exceed the elastic limits of the spring metal of the ring, thus to insure that, when released, the ring will return to its unstressed condition. Obviously, the dimensions of both the ring and its seating groove, and, more particularly, the section height (radial width) of the ring and the depth of the groove, are dependent on the allowable working stress to which the ring is subjected, with the result that neither the ring section height nor the depth of the groove can exceed certain limits. There are also certain limitations to the use of the conventional spring ring, for example, in ring assemblies with parts rotating at high R. P. M.'s and/or wherein the ring is subjected to high thrust loads combined with heavy vibrations and impacts, in which cases the spring ring does not provide a secure shoulder.

It has been suggested heretofore to employ socalled soft rings, i. e. rings made from a ductile metal of relatively low elastic limit as external rings forming an artificial shaft shoulder. Such soft metal retaining rings are in the form of split rings of uniform section height having an initial internal diameter somewhat larger than the diameter of the shaft, so that they can be shifted freely over the shaft to the plane of the groove, being thereupon compressed (squeezed) into the groove by means such as an annular die, the compression of the ring being in the range of plastic deformation, i. e. in excess of the elastic limit. Such known soft retaining rings, however, have characteristic disadvantages and have not been widely used. Firstly, they are difficult to assemble because of the requirement that they must be compressed all around in their groove by an annular die. While some of the prior soft metal rings have been formed with protruding lugs providing abutments for pliers operating to contract the ring into the groove, it has been found that the initially circular ring of soft metal having uniform section height deforms ovally when closed or contracted and consequently cannot be tightly fitted against the bottom of the groove. It has also been suggested to give the ring an initially oval shape in the hope that it would deform to a circle when squeezed or compressed into its groove. But even in this case the ring will deform from its initial oval shape to true circular shape under a predetermined degree of deformation only, which is difficult to apply correctly. In any position of the ring between the original oval shape and the desired final circular form, there exists a certain amount of deviation from the latter form which results in point contact between ring and groove bottom rather than a tight fit of the ring all around.

Furthermore, a ring having an initial oval shape requires specially shaped dies and punches to stamp the same from strip material, a requirement that results in a considerable increase in the cost of their production. And even if all of the above requirements are met, it has been found that when a soft metal ring, whether of the oval or uniform section height type, is squeezed or otherwise compressed into its groove, it will always have a certain amount of spring-back action, more commonly referred to as rebound, no matter how strong the pressure applied by the seating tool. Even though the rebound action may be slight, it is nevertheless sufficient to preclude a tight abutment of the ring against the groove bottom, with the result that soft metal rings as heretofore known do not give a secure fit against the groove bottom comparable with that of spring rings of the type adapted to pressure-fit themselves against the groove bottom, as is necessary to prevent relative slippage or rotation between ring and shaft.

Since soft metal rings of uniform section height and initially circular shape were heretofore required to be assembled by means of an annular die, it becomes obvious that it is impractical, if not impossible, to assemble soft metal rings in the usually small diameter housing bore, with the result that uses of such a ring as a bore shoulder are non-existent at the present time. Nevertheless, there are cases in which the use of the internal spring metal ring may be objectionable from the standpoint of high thrusts combined with vibrations and/or impacts.

Accordingly, a principal object of the invention is to provide soft metal retaining rings of both the so-called external and internal types having a diameter such that they may readily be shifted over a shaft or inserted in a housing bore to the plane of the groove, whereupon they may be deformed (contracted in the case of the external ring and expanded in the case of the internal ring) by means of a simple plier-type tool and in such manner that they secure themselves tightly throughout their full arcuate length in the shaft or housing bore groove. A further important object of the invention is to provide a soft metal retaining ring of the type that can be squeezed into a shaft or housing bore groove and which is so constructed that the groove may be of appreciable depth and that the ring may protrude by a considerable amount from the groove thereby to form a substantial depth and highly secure shoulder for the machine part to be held thereby, even under the unfavorable conditions of high R. P. M.'s, severe vibrations and/or heavy impact loads.

Yet another object of the invention is the provision of a retaining ring which is capable of being deformed within the so-called plastic range yet maintains its effective circularity under any degree of deformation, with the result that the ring is capable of maintaining circular contact with the groove bottom or side walls throughout its full arcuate length.

Still another object of the invention is to provide improved forms of retaining ring assemblies of the type employing a soft metal retaining ring seated in a shaft or housing bore groove and capable of forming a secure shaft or housing bore shoulder for a machine part to be held or located thereby, in which the relatively outer wall of the groove or the outer face of the ring, or both, are provided with a taper or inclination, through the medium of which an extremely tight pressure fit of the ring between the walls of the groove or between the front groove wall and the front face of the machine part being held is achieved, the rebound action of the rings is overcome, and the objectionable loose fit of the conventional soft retaining ring in its groove is eliminated.

The above and other desirable and practical objects of the invention are achieved according to the invention through the provision of an open-ended retaining ring made from soft (ductile) metal, characterized principally by the fact that it is capable of maintaining circularity when deformed in the plastic range, i. e. in excess of its elastic limit, to any degree between its initial and finally deformed condition. To this end, the soft metal ring is of tapered construction, that is to say, its section heights progressively decrease by a calculated amount from its middle section to its free ends, such tapering of the ring being effected by making the inner circular edge of the ring eccentric to the outer circular edge and thereby diminishing the moments of inertia of the ring sections, or the section moduli, from maximum value at the mid section of the ring to minimum value near its free ends.

When functioning as a shaft (external) ring, the herein proposed rings are formed with an effective inner diameter which is initially larger by a small amount than the shaft diameter, so that the rings may be readily slipped over their shafts in their assembly. By providing such a ring with apertured protruding lugs or ears at its open ends, such a ring may be readily closed and squeezed into the groove by means of a plier-type tool, the effective inner edge of the ring meantime maintaining circularity during its closing and when finally seated. In the case of the internal ring, the effective outer diameter thereof is initially such that it may be readily slipped into the housing bore in its assembly and thereupon spread and squeezed into its groove by the conventional plier-like tool, such a ring similarly maintaining circularity during its spreading and when finally seated.

Rings according to the invention may be constructed of any of the soft metals of relatively low elastic limit, for example, cold-rolled steel, brass, soft bronze, aluminum and the like. Since the ring will be deformed in the plastic range in any case, the section height of the ring as well as the depth of the groove may be chosen according to the special requirements of a particular design rather than according to stress considerations, and hence the later impose no limitations on the dimensioning of either the ring or groove.

In the accompanying drawings illustrating typical retaining ring assemblies and the improved retaining rings employed therein according to the invention:

Fig. 1 is a plan view of one form of soft metal internal retaining ring according to the invention;

Fig. 2 is a plan view illustrating another form of soft metal internal retaining ring of the invention;

Figs. 3, 4 and 5 are typical sections taken through retaining ring assemblies illustrating the seating and holding action of the soft metal internal rings illustrated in Figs. 1 and 2;

Fig. 6 is a plan view of one form of soft metal external retaining ring according to the invention;

Fig. 7 is a plan view of another form of soft metal external retaining ring of the invention;

Figs. 8, 9 and 10 are partial sectional views taken through retaining ring assemblies illustrating the seating and securing action of the soft metal external retaining rings as illustrated in Figs. 6 and 7;

Figure 15:
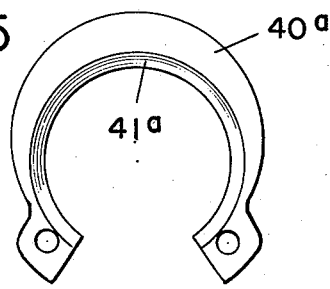
Fig. 15 is a plan view of a soft metal external retaining ring corresponding to that shown in Fig. 6 but characterized by an edge zone extending along the inner or groove edge of the ring which is inclined to the ring body portion.
Figure 16:
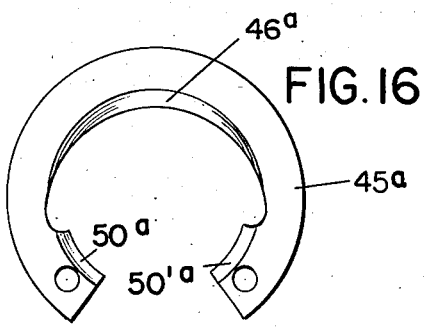
Figure 17:
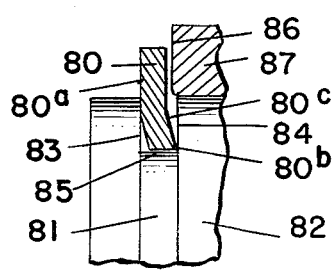
Figure 18:
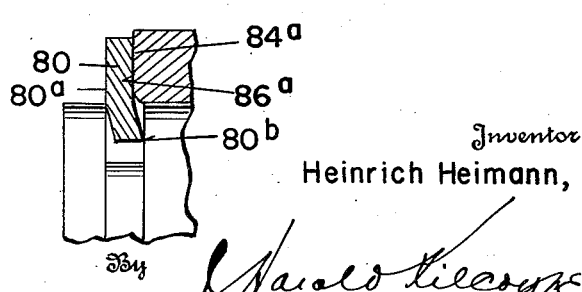

Fig. 16 is a plan view of another form of soft metal external retaining ring corresponding generally to the form thereof shown in Fig. 7, but characterized by edge zones along the inner groove edge of the ring which are inclined to the ring body; and Figs. 17 and 18 are typical sections taken through retaining ring assemblies illustrating the holding and securing action of retaining rings of the type shown in Figs. 15 and 16.

Referring to the drawings, reference character 10, Fig. 1, generally indicates a soft metal retaining ring of the so-called internal type adapted to form an artificial shoulder in a housing bore. Initially, such a ring is of nearly closed construction and the diameter $x$ of its outer circular edge 11 is somewhat less than the diameter of the housing bore whereby the ring can be readily inserted therein to the plane of its seating groove. The inner edge 12 of the ring is also circular, but its circle is eccentric to the outer edge, so that the ring tapers, i. e. has progressively diminishing section height, from its mid portion $a$ to points $b$, $b'$ near its free ends. The free ends of the ring are formed with inwardly protruding lugs or ears 13, 13', preferably provided with apertures 14, 14' for receiving the points of a plier-like tool (not shown) by which the ring may be spread and squeezed into its groove by bending the same in the plastic range, i. e. beyond the elastic limit of the soft metal of which it is fabricated. Spreading of the ring as aforesaid results in the outer circular edge 11 thereof being squeezed against the groove bottom or the groove wall adjacent thereto (as will be described) with tight fit all around, excepting for the gap between its free ends. Due to its tapered construction, the ring in its deformed state will maintain its circular form under any degree of deformation to which it is subjected and hence its outer or groove edge is concentric to the circle both of the groove bottom and of the housing bore as well.

In the Fig. 2 modification is illustrated another form of soft metal internal retaining ring of a design which is adapted to maintain a uniform depth of shoulder within the bore. Such a ring generally designated 15 is defined by an outer circular edge 16 and an inner circular edge 17, of which the circle of the inner edge is adapted to be disposed concentric to and has substantially smaller diameter than the circle of the housing bore. The free ends of the ring are formed as shown with outwardly protruding, apertured ears 19, 19', having outer arcuate edges 20, 20' which lie on a circle containing and having the same radius as the mid point 18 of the arc of the outer ring edge 16. To maintain its circularity under deformation, the outer edge 16 of the ring body is formed eccentric to the inner edge 17 thereof, with the result that the ring tapers, i. e. its section heights progressively decrease, from its mid portion $c$, corresponding to the point 18 of the outer circular edge 16, to points $d$, $d'$ near the free ends thereof. The circle containing the point 18 of the ring outer edge and the arcs 20, 20' of the ears 19, 19' is slightly smaller in diameter $x'$ than that of the housing bore, so that the ring may be readily slipped into the bore to the plane of the groove in its assembly. The ring is seated into its groove by deforming the same outwardly in the plastic range whereupon it bears against the groove bottom or side wall at point 18 and along the ear edges 20, 20'. Due to its tapered construction, its effective inner edge (point 18 and ear edges 20, 20') maintains circularity under deformation. Accordingly, the inner edge or shoulder forming portion of the ring provides a uniform depth of shoulder which protrudes into the bore throughout the full arcuate length of the ring.

If a soft metal internal ring according to Figs. 1 and 2 were to be forced into a groove having parallel straight walls and width greater by a few thousandths of an inch than the axial thickness of the ring, the ring would be required to be forced into the groove until its outer circular edge 11, or parts thereof as in Fig. 2, would abut the groove bottom. Since even a ring made of soft metal, when deformed in the plastic range, has a small amount of rebound, a slip rather than a tight fit of the rings is likely to occur, unless greater than normal plier forces are applied. To avoid this difficulty, the invention contemplates ring assemblies insuring a tight, non-slip fit of the ring in its groove, as typically shown in Figs. 3, 4 and 5.

In Fig. 3, reference character 30 indicates a soft metal internal ring of either of the forms illustrated in Figs. 1 and 2 seated in the groove 31 opening into the bore of a housing 32. The groove 31 is tapered, that is to say, its front wall 33 is slightly inclined relative to its straight rear wall 34. Also, the width of the groove bottom 35 is slightly less than the axial thickness of ring 30. Accordingly, when the ring 30 is squeezed or forced into the groove, its outer groove edge will in effect be clamped between the rear straight wall 34 of the groove and its inclined front wall 33, due to the narrowing of the groove adjacent its bottom. This clamping of ring edge is such that the ring will be securely held against slippage in its groove and will also bear tightly against the end face 36 of the machine part 37, provided the latter is flush with the straight groove wall 34, as shown.

A somewhat differing assembly is illustrated in Fig. 4, in that the end face 36a of the machine part 37a to be secured by the ring overhangs the rear straight wall 34a of the groove 31a, whose front wall 33a is inclined similarly to that of the Fig. 3 assembly, with the result that the effective width of the groove is less than the axial thickness of the seating edge zone of the ring. It will be observed from an analysis of Fig. 4 that when ring 30a is squeezed into groove 31a, its outer edge zone will be clamped between the inclined groove wall 33a and the overhanging front face 36a of the machine part. Accordingly, a secure fit of the ring in its groove is achieved, and end play of the machine part is prevented.

The ring assembly illustrated in Fig. 5 employs, in addition to the features of the inclination of the front wall 33b of the groove and the overhang of the machine part 37b, as described in connection with the Fig. 4 assembly, a ring 30b whose relatively front face is provided with an inclination or taper 30c extending along its outer edge and which corresponds to the inclination of the groove front wall 33b. When such a tapered-face ring is squeezed into its groove 31b, the tapered surfaces 30c, 33b of ring and groove coact to rigidly clamp the ring between the groove front wall and the front face 36b of the machine part, thereby to secure the ring against slippage or rotation in the groove.

Whereas the rings shown in Figs. 1 and 2 are of the internal type, reference character 40 (Fig. 6) generally indicates a soft metal external ring of the type designed to be slipped over a shaft in assembly and, when squeezed or forced into the shaft groove, to form an artificial external shoulder on the shaft. The ring is defined by an inner circular edge 41 whose diameter $y$ is slightly greater than the diameter of the shaft over which it is to be slipped, and with an outer circular edge 42 which is eccentric to the inner edge whereby the ring is tapered from its mid portion $e$ having maximum section height to points $f$, $f'$, near the free ends thereof having minimum section height. As seen, the ends of the ring are spaced by a large width gap and are formed as outwardly protruding ears 43, 43' provided with apertures 44, 44' for the reception of working points of a plier-like tool by which the ring is contracted to seat in its groove. Due to its tapered construction, the inner circular edge 43 of the ring maintains circularity when the ring is deformed within the plastic range under any degree of deformation applied thereto.

Referring to Fig. 7 illustrating a modified form of soft metal external ring designed to provide a uniform depth of shoulder when assembled on its shaft, such a ring which is generally designated 45 is defined by an inner circular edge 46 and an outer circular edge 47, the circle of the latter edge being adapted to be disposed concentric with the circle of the shaft periphery in final assembly. The inner edge 46 is eccentric to the outer edge 47 by a calculated amount, so that the ring tapers from its mid-section $g$ to points $h$, $h'$ near the free ends. As shown, the free ends of the ring are provided with tool point apertures and are formed as inwardly directed lugs 49, 49' defined by inner arcuate edges 50, 50' lying on a circle struck from the same center as that of the outer circular edge 47 and containing the mid point 48 of the arc of the inner ring edge 46, said circle having diameter $y'$ which is slightly greater than the diameter of the shaft circle.

When such a ring is squeezed into its groove, it deforms circularly due to its tapered construction and thus bears at the point 48 and along arcs 50, 50'. Thus, since its outer edge 46 is now disposed concentric with the shaft circle, the ring protrudes equally from the shaft periphery to form a uniform depth of shoulder throughout its full arcuate length.

Figs. 8, 9 and 10 represent typical assemblies of external retaining ring assemblies employing soft metal rings of the form shown in Figs. 6 and 7. Referring to Fig. 8, reference character 60 indicates a ring corresponding to one of the Figs. 6 and 7 forms thereof seated in a groove 61 of a shaft 62. The front wall 63 of the groove is inclined slightly to the rear wall 64 which is formed straight as shown. The width of the groove bottom 65 is somewhat less than the axial thickness of the ring, with the result that when the ring is squeezed into its groove, its inner edge, corresponding to the edge 41 (Fig. 6) or the point 48 and arcuate edges 50, 50' (Fig. 7) are in effect clamped between the inclined front wall 63 of the groove and the straight rear wall of the groove. If the front face 66 of the machine part 67 extends flush with the rear groove wall 64 as shown, the ring tightly abuts the machine part also. Accordingly, the ring is securely held against slippage or rotation in its groove.

According to Fig. 9, the machine 67a is disposed so that its front face 66a overhangs the rear straight wall 64a of the shaft groove 61a. The front wall 63a of the groove is inclined as shown, with the result that when ring 60a, corresponding to either one of the rings shown in Figs. 6 and 7, is squeezed into the groove, its inner edge portion is clamped between the inclined front wall 63a of the groove and the straight front face 66a of the machine part. Accordingly, the ring is held against slippage or rotation in the groove.

In the Fig. 10 assembly, the ring 60b is of the type wherein its relatively front face is provided with a taper 60c extending along its inner or groove edge, whose inclination corresponds to that of the front wall 63b of the groove. The front face 66b of the machine part 67b is shown to overhang the rear straight wall 64b of the groove. Thus, when the ring is squeezed into its groove 61b as aforesaid, the inclined surface 60c of the ring coacts with the inclined front wall 63b of the groove to wedge or clamp the inner edge portion of the ring between said wall and the front face 66b of the machine part, with the result that the ring is securely held against slippage or rotation in the groove.

Figure 11:
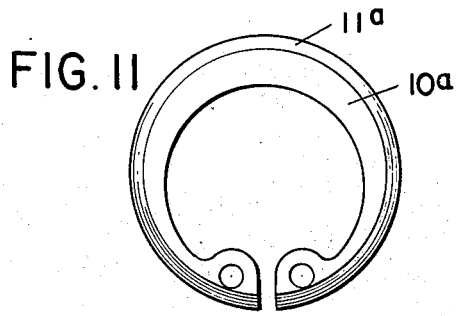
Fig. 11 is a plan view of a soft metal internal retaining ring corresponding to that shown in Fig. 1 in which the ring is provided with an inclined edge zone extending along the groove edge of the ring.
Figure 12:
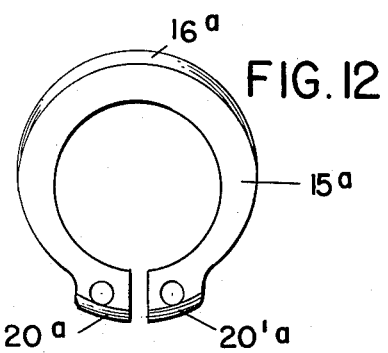
Fig. 12 is a plan view of another form of soft metal internal ring which corresponds generally to the ring shown in Fig. 2 but differs therefrom in having edge zones which are inclined to the ring body along the effective outer or groove edge of the ring.
Figure 13:
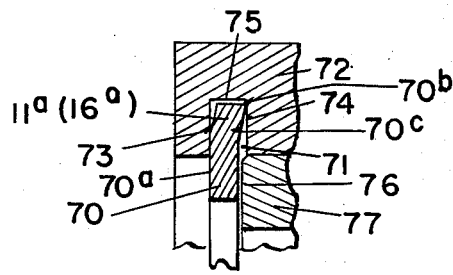
Figs. 13 and 14 are typical sections illustrating the seating and holding action of the soft metal internal rings illustrated in Figs. 11 and 12.
Figure 14:
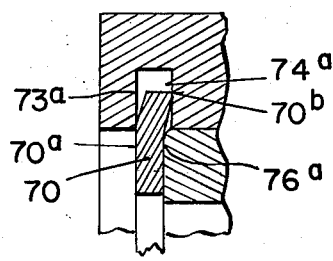

Figs. 11 and 12 illustrate forms of soft metal internal rings corresponding to those illustrated in Figs. 1 and 2, but differing therefrom in that the annular zone 11a along the outer or groove edge of the ring shown in Fig. 11, which corresponds to the Fig. 1 form of ring, is inclined, as by bending, to the plane of the ring body portion 10a, and that the outer edge portions 16a, 20a, 20'a of the ring shown in Fig. 12, corresponding to the Fig. 2 form, are similarly bent out of the plane of the ring body portion 15a. Referring to Figs. 13 and 14 illustrating typical retaining ring assemblies employing one or the other forms of internal rings as shown in Figs. 11 and 12, reference character 70 represents either form of such rings seated in a groove 71 opening inwardly into the bore of a housing 72. Both front and rear side walls 73, 74 of the groove are formed straight, and the width of the groove bottom 75, and hence of the groove throughout its full depth, is somewhat less than the overall axial thickness of the ring along its outer edge, as measured from the line of its front face 70a and the rear corner 70b formed by the intersection of the ring outer edge and its rearwardly offset or inclined face 70c as results from the bending of the ring along its edge as aforesaid. The described arrangement is such that as the ring 70a is squeezed into the narrower width groove, with the machine part 77 having slight play with reference thereto, as shown, it is clamped or gripped between the front and rear walls of the groove and accordingly slippage or rotation thereof within the groove is prevented. When the machine part 77 is disposed so that its front face 76a overhangs the rear wall 74a of the groove, as in Fig. 14, the effect is to rigidly secure the ring between front wall 73 of the groove and the front face 76 of the machine part.

Figs. 15 and 16 illustrate variant forms of the soft metal external rings illustrated in Figs. 6 and 7, according to which the rings are provided along their full inner edge with an edge zone 41a (Fig. 15) or with inner edge portions 46a, 50a, 50'a (Fig. 16) which are inclined, as by bending, to the plane of their ring bodies 40a, 45a, respectively. Retaining ring assemblies employing such variant forms of ring are illustrated in Figs. 17 and 18 wherein the ring is designated by the reference character 80. Referring to Fig. 17, the ring seats in a groove 81 provided therefor in a shaft 82, the side walls 83, 84 of the groove being formed straight. The width of the groove as measured by the groove bottom 85 is somewhat less than the overall axial thickness of the ring along its inner edge as measured from the line of its front face 80a and the rear corner 80b formed by the intersection of the inner edge of the ring and its rearwardly offset face 80c. Upon squeezing the ring 80 into the narrower width groove 81, and with the machine part 87 to be secured by the ring having slight play with respect thereto, the ring is tightly clamped between the front and rear walls thereof in the manner shown. When the machine part is disposed so that its front face 86a overhangs the rear wall 84a of the groove, as in Fig. 18, the ring is clamped between said front face and the front wall of the groove generally as shown. In both the Figs. 17 and 18 assemblies, the ring is securely held against slippage or rotation in the groove.

Without further analysis, it will be appreciated that soft metal rings according to the invention achieve the above stated and other practical objects as well in providing both internal and external rings made from soft metal, which can be squeezed into their grooves by simple plier-like tools, and which are capable of maintaining circularity when deformed so as to have tight fit all around when seated. Due to the property of such rings of expanding or contracting circularly, i. e. maintaining their circularity when deformed, such rings overcome the disadvantages of the prior soft metal rings of uniform section height in deforming ovally when squeezed into their grooves or in deforming circularly only under great pressure. In the case of the internal ring particularly, the invention makes such a ring practical where it was non-existent previously, due to the fact that the prior rings had to be squeezed into their grooves by an annular die which is impossible to insert in a housing bore due to space limitations.

Since soft metal rings according to the invention are formed with effective diameter which is smaller than the housing bore diameter in the case of the internal ring, and larger than the diameter of the shaft in the case of the external ring, they are easier to assemble than spring metal rings which have to be initially contracted for insertion in their housing bore or initially expanded to be slipped over their shaft. Inasmuch as soft metal rings are applied through deformation in the plastic range, i. e. bending beyond their elastic limits, their dimensions may be chosen according to the special requirements of the ring assembly rather than according to stress and strain considerations. Hence, the present soft rings may have greater radial width (section height) than spring rings, and the grooves in which they seat may also be formed deeper than those provided for the reception of spring rings wherein stress and strain considerations are paramount. It is a further advantage of the invention that when squeezed into their grooves, rings as herein proposed do not have the undesired rebound action, but, on the other hand, pressure fit themselves throughout their full arcuate length, if not against the groove bottom, then against the side walls of the groove or intermediate a groove wall and the machine part to be held. Accordingly, the very act of assembling soft metal rings according to the invention insures pressure fit of the ring in its groove and, in the proper case, tight face engagement between ring and machine parts as well.

As many changes could be made in carrying out the above construction without departing from the scope of the invention, it is intended that all matter contained in the above description or shown in the accompanying drawings shall be interpreted as illustrative and not in a limiting sense.

I claim:

1. A retaining ring adapted upon assembly in a seating groove provided therefor in a carrying part to provide an artificial shoulder for securing a machine part against axial displacement on the carrying part, said ring being made of soft metal and adapted to be assembled in its groove by deformation in the plastic range and having progressively decreasing section height from its middle portion to its free ends whereby it maintains circularity when deformed, the diameter of the ring being initially such that it may be mounted on said carrying part without any preliminary deformation, the free ends of the ring being formed as apertured lugs, and the groove seating edge portion of the ring being inclined to the plane of the ring body.

2. A retaining ring as set forth in claim 1, wherein the inner edge portion of the ring is inclined and provides the seating edge.

3. A retaining ring as set forth in claim 1, wherein the outer edge portion of the ring is inclined and provides the seating edge.

4. A retaining ring as set forth in claim 1, wherein the lugs are outwardly disposed and wherein the inner edge portion of the ring is inclined and provides the groove-seating edge.

5. A retaining ring as set forth in claim 1, wherein the lugs protrude inwardly from the inner edge of the ring which is eccentric both to the circle of the outer edge of the ring and to a circle containing the mid-point of the said inner edge and the inner arcuate edges of said lugs, and wherein the inner edge portion of the ring at said mid-point and the inner edge portions of said lugs provide the inclined groove-seating edge portion of the ring.

6. A retaining ring as set forth in claim 1, wherein the lugs are inwardly disposed and wherein the outer edge portion of the ring is inclined and provides the groove-seating edge.

7. A retaining ring as set forth in claim 1, wherein the lugs protrude outwardly from the outer edge of the ring which is eccentric both to the circle of the inner edge of the ring and to a circle containing the mid-point of said outer edge and the outer arcuate edges of said lugs, and wherein the outer edge portion of the ring at said mid-point and the outer edge portions of said lugs provide the inclined groove-seating edge portion of the ring.

8. A retaining ring as set forth in claim 1, wherein said inclined groove-seating edge portion of the ring is bent out of the plane of the ring body.

9. A retaining ring as set forth in claim 1, wherein the inclination of the groove-seating edge portion of the ring is provided by a tapered surface extending along said edge portion.

HEINRICH HEIMANN.

REFERENCES CITED

The following references are of record in the file of this patent:

UNITED STATES PATENTS

| Number | Name | Date |
| --- | --- | --- |
| Re. 18,144 | Heiermann | Aug. 4, 1931 |